P. J. THOMAS.
COTTON SACK.
APPLICATION FILED MAR. 13, 1917.
1,386,447.
Patented Aug. 2, 1921.
2 SHEETS—SHEET 1.
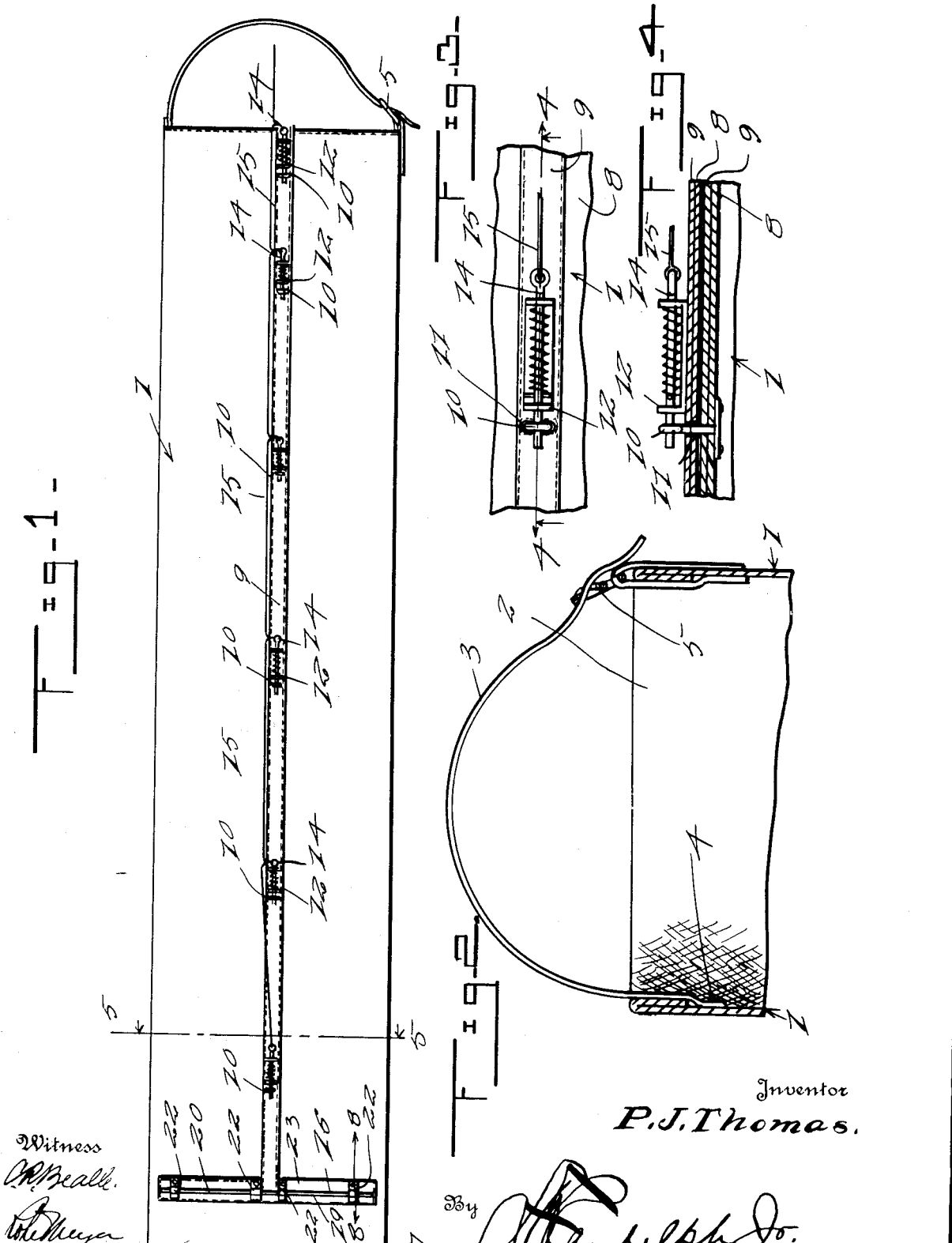
Witness
C. R. Bealle
[signature]
Inventor
P. J. Thomas.
By 
Attorney P. J. THOMAS.
COTTON SACK.
APPLICATION FILED MAR. 13, 1917.
1,386,447.
Patented Aug. 2, 1921.
2 SHEETS—SHEET 2.
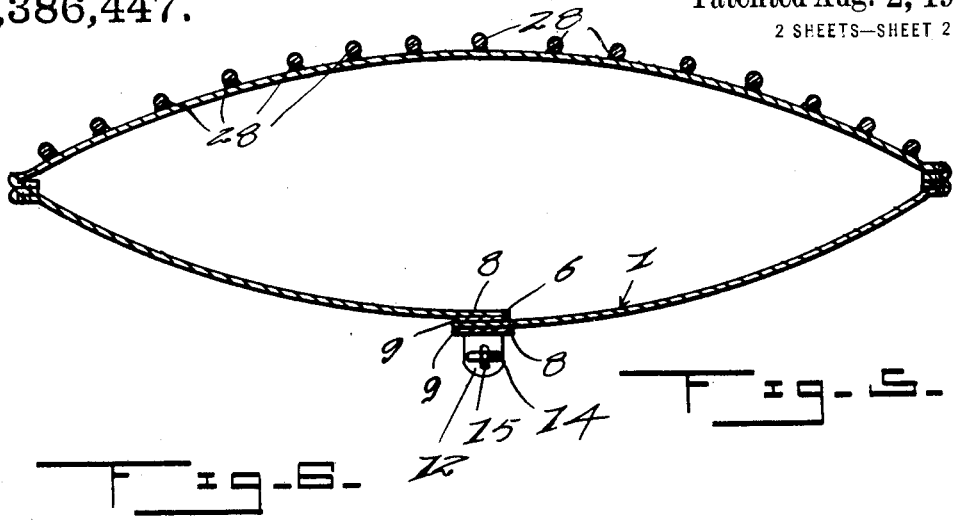
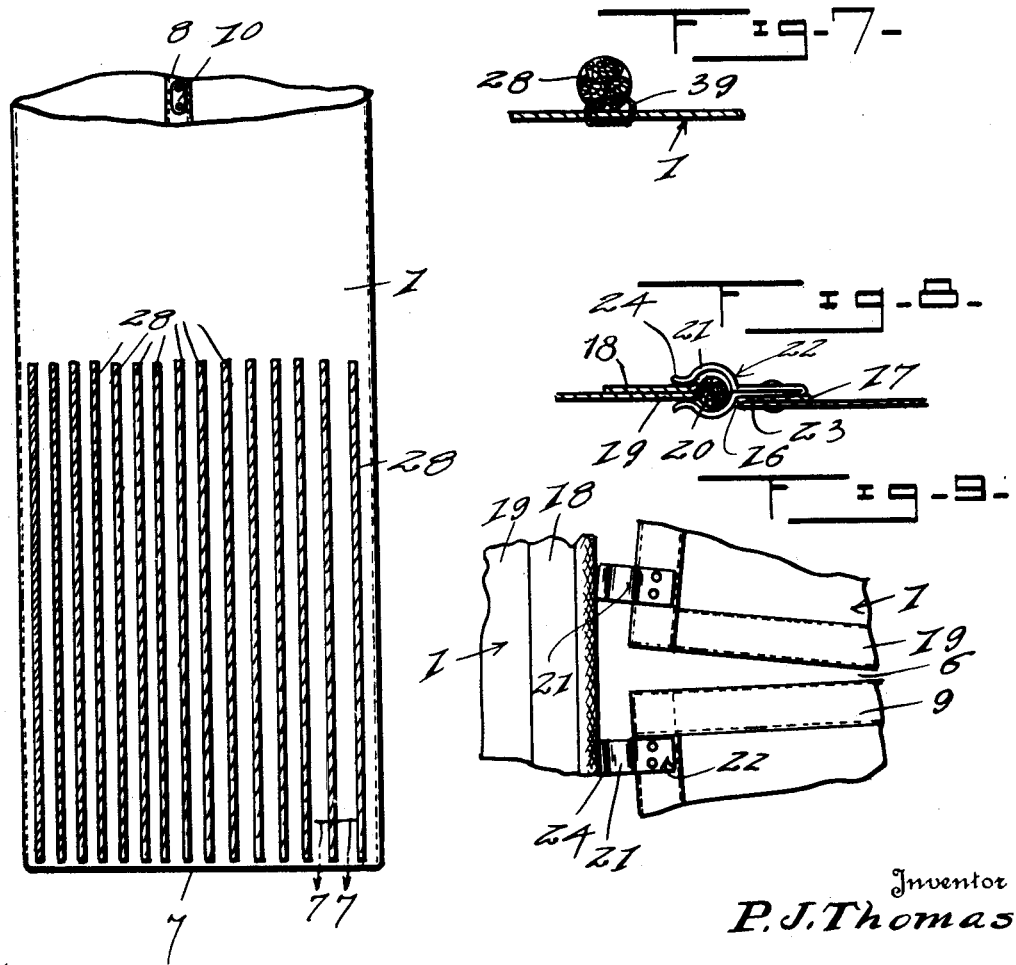
Inventor
P. J. Thomas.

UNITED STATES PATENT OFFICE.

PETER J. THOMAS, OF SAPULPA, OKLAHOMA.

COTTON-SACK.

1,386,447.  Specification of Letters Patent.  Patented Aug. 2, 1921.

Application filed March 13, 1917. Serial No. 154,490.

*To all whom it may concern:*

Be it known that I, PETER J. THOMAS, a citizen of the United States, residing at Sapulpa, in the county of Creek and State of Oklahoma, have invented certain new and useful Improvements in Cotton-Sacks; and I do hereby declare the following to be a full, clear, and exact description of the invention, such as will enable others skilled in the art to which it appertains to make and use the same.

This invention relates to sacks used in picking cotton, and the primary object of the invention is to provide a cotton sack from which the contents may be quickly and easily emptied and one which has its ground engaging surface reinforced so as to materially decrease the wear upon the sack occasioned by dragging it over the ground.

Another object of this invention is to provide a cotton sack as specified, which is split longitudinally of the sack from the mouth of the sack to within a short distance of the bottom of the sack, where a laterally extending split is provided so that when the split portions of the sack are opened the contents may be easily and quickly emptied from the sack eliminating the necessity of shaking the contents out of the mouth of the sack, and further to provide novel catch structures for holding the edges of the split portions in overlapping engagement which catch structures may be operated by the pulling upon a cord for releasing them to permit the opening of the split portion of the sack.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a face view of the improved cotton sack;

Fig. 2 is a fragmentary section illustrating the shoulder strap of the cotton sack;

Fig. 3 is an enlarged fragmentary detail illustrating one of the catch structures employed for holding the overlapping edges in engagement;

Fig. 4 is a section on the line 4—4 of Fig. 3;

Fig. 5 is a section on the line 5—5 of Fig. 1;

Fig. 6 is a fragmentary view of the bottom of the sack illustrating the manner of reinforcing the ground engaging portion of the sack;

Fig. 7 is a section on the line 7—7 of Fig. 6;

Fig. 8 is a section on the line 8—8 of Fig. 1; and

Fig. 9 is an enlarged fragmentary detail illustrating the manner of connecting the transverse or lateral edges of the lateral slits or openings.

Referring more particularly to the drawings, 1 designates the cotton sack as an entirety which is preferably constructed of heavy duck or canvas, and which has a mouth 2 positioned at one end of the sack, as is ordinary in sack constructions, through which mouth the sack is filled when picking cotton. A shoulder strap 3 has one end stitched or otherwise suitably attached as illustrated at 4 to the sack 1 near the mouth of the same. The shoulder strap 3 is adjustably connected through the medium of a buckle 5 to the opposite side of the sack 1 from the point 4, as clearly shown in Figs. 1 and 2 of the drawings, so that the length of the strap may be adjusted to fit the shoulders of different persons carrying the sack.

The sack 1 is split longitudinally, as indicated at 6 in Fig. 5 of the drawings, from the mouth 2 of the sack to within a short distance of the bottom or closed end 7. The edges of the split portion of the sack overlap as shown at 8 and they are reinforced by suitable reinforcing strips 9. When the split portion of the sack is closed, the reinforced edges 8 overlap as clearly shown in Figs. 4 and 5 of the drawings. The innermost overlapping edge 8 has a plurality of eyes 10 carried thereby at spaced intervals, which eyes project through openings 11 formed in the outermost of the overlapping edges 8. A plurality of brackets 12 are carried by the outermost overlapping edges 8 and they slidably support spring controlled locking pins 14 which are adapted to extend through the eyes 10 for holding the overlapping edges in firm engagement with each other for closing the split portion of the sack and securely holding the contents within the sack. The bolts 14 have cords 15 connected thereto, which cords are all connected to each other so that when one of the cords is pulled, all of them will be pulled in unison for moving all of the bolts 14 out of all of the eyes 10 to permit of the spreading of the overlapping edges of the sack for the purpose of emptying the contents therefrom.

The sack 1 is provided with a transversely extending slit 16 near its bottom 7 which communicates with and extends an equal distance upon each side of the longitudinal slit 6. The edges of the lateral slit 16 are reinforced by overlapping of the duck or canvas of which the sack is formed, or by reinforcing strips, as desired, as indicated at 17 and 18. The lower edge 19 of the split 16 has a rope 20 attached thereto in any suitable manner which rope is engaged by the resilient arcuate arms 21 of spring catch structures 22. The spring catch structures 22 are secured in any suitable manner to the edge 23 of the transversely extending slit 16, as clearly shown in Fig. 8 of the drawings and they comprise the spaced arcuate spring portions 21 which have their outer edges outwardly curved as shown at 24 to provide a guiding constricted mouth for passing over the rope 20 and preventing accidental disconnection between the edges 19 and 23 of the split 16.

The opposite side of the sack from the split side is reinforced, for a relatively short distance upwardly from the bottom 7 of the sack by ropes 28 which are sewed or otherwise suitably connected to the outer surface of the body of the sack 1 as shown at 39. The ropes 28 are positioned upon the ground engaging portion of the cotton sack for taking up the wear occasioned by dragging the sack over the ground and preventing the wearing through of this portion of the sack. The ropes 28 are attached in parallel spaced relation to each other and parallel with the length of the sack as clearly shown in Fig. 6 of the drawings.

When the cotton picker is picking cotton and putting it in the sack, the overlapping edges of the splits 6 and 16 of the sack are securely connected by their respective catches so as to prevent the cotton from falling out of the sack. After the sack has been filled and it is desired to empty the contents thereof, the cord 15 is pulled for moving all of the spring controlled pins 14 out of the eyes 10 which permits the spreading of the overlapping edges 8 of the split 6, allowing the greater portion of the cotton to fall out of the sack. If the cotton does not fall from the bottom end 7 of the sack, the meeting edges 19 and 23 of the transverse slit 16 may be disconnected by pulling the spring catches 26 off the rope 20 and thus the corners of the bottom of the sack may be thoroughly cleaned of any cotton which might cling thereto.

From the foregoing description taken in connection with the accompanying drawings the advantages of construction and of the method of operation of the improved cotton sack, will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

A cotton sack including an elongated body having a closed end and said body being slitted longitudinally and transversely to provide flaps with overlapping edges, keepers secured to one of the flaps along the longitudinal slit and extending through the other flap, spring pressed locking pins secured to the last named flap and engaging the keepers, means connecting the pins to permit operation thereof simultaneously and spring clips detachably connecting the flaps along the transverse slit and adapted to become disconnected by the flaps being swung open along their longitudinal slit.

In testimony whereof I affix my signature in presence of two witnesses.

PETER J. THOMAS.

Witnesses:
GARNETT JOHNSON,
C. B. STOBBERFIELD.